July 4, 1967  H. REES  3,328,844
INJECTION-MOLDING MACHINE AND UNTHREADING MEANS THEREFOR
Filed Oct. 23, 1964
7 Sheets-Sheet 1

Fig.1

Herbert Rees
INVENTOR.
BY Karl F. Ross
AGENT

Herbert Rees
INVENTOR.

BY Karl F. Ross
AGENT

United States Patent Office 3,328,844
Patented July 4, 1967

3,328,844
INJECTION-MOLDING MACHINE AND UNTHREADING MEANS THEREFOR
Herbert Rees, Willowdale, Ontario, Canada, assignor to Husky Manufacturing & Tool Works Ltd., Toronto, Ontario, Canada, a corporation of Canada
Filed Oct. 23, 1964, Ser. No. 406,023
7 Claims. (Cl. 18—30)

My present invention relates to injection-molding machines of the general type described in my U.S. Patent No. 3,117,348 and my pending application Ser. No. 321,218, filed Nov. 1, 1963, now Patent No. 3,254,371. More particularly, this invention relates to an unthreading attachment and means for use with such machines.

While the injection-molding of threaded articles and other articles having formations requiring that they be removed from a mold by rotating them is not uncommon, many difficulties have been encountered in providing automatic apparatus for the unthreading of these articles. In general, several types of unthreading systems are used. The most common system provides automatic devices within one of the mold members which rotate and withdraw the articles during the opening movement of the mold. Not only is such a system complicated by virtue of its incorporation in the mold structure but additionally this arrangement is of limited value when a multiplicity of mold cavities are provided in the common mold plate; the latter difficulty arises from the fact that the gearing and transmission systems required to drive the rotating elements necessitates many parts and is so complex that the cost of multicavity molds becomes prohibitive. To avoid the disadvantages of high cost and complexity, some installations still accomplish removal by manual unthreading of the articles or with the aid of motor-driven and hand-operated appliances.

It is a principal object of the present invention to provide a device of the general character described which enables the automatic removal of a threaded article from a mold member and yet is free from the complexities and cost problems affecting earlier systems.

A more specific object of this invention is to provide a mechanism for the unthreading of injection-molded articles which permits the simultaneous withdrawal of a plurality of articles from the mold and thereby expedites the production of the articles.

These objects and others which will become apparent hereinafter are attained, in accordance with the present invention, by the provision of a mechanism or a screw machine of the character described which oscillatingly displaces a mold member threadedly engaging one or more articles out of the injection-molding station and into an unthreading station wherein the article is engageable by gripper means rotatively withdrawing it from the mold member. An important feature of the present invention resides in the oscillating movement of the mold member between the two stations, thereby eliminating a continuous displacement of a mold plate or the like, and enabling a conventional mold member with associated cooling means (e.g., water inlet and outlet lines) to be used without requiring complex connectors or the like.

According to another feature of the present invention, the mold consists of at least two members provided with guide rails, aligning bars or the like permitting the relative displacement of the members, the swingable mold member being pivoted on one of these members for movement from the molding station to the unthreading station. Thus a system according to the present invention can be constituted as an attachment for a conventional injection-molding machine and may be provided with a support upon which a portion (e.g., the central portion of a tripartite mold, but conceivably any other mold member) of a mold is swingable in a transverse plane out of alignment with the other mold portions to the unthreading station; at the unthreading station, a holder is movable generally perpendicularly to this plane and is provided with engaging means (e.g., the gripper means mentioned above) and with drive means whereby the holder is advanced toward the swung-out mold portion for engagement of the molded article by the gripper means. The system also comprises a mechanism operable upon such engagement for rotating the gripper means jointly with the molded articles relative to the swung-out mold portion at the unthreading station.

According to an important feature of this invention, the holder is provided with a multiplicity of friction cups, rotatably journaled thereon, through the centers of which fixedly positioned ejector pins extend to dislodge the molded articles when the holder plate is retracted from the mold portion disposed at the unthreading station. Each of the friction cups is, advantageously, keyed to a respective spindle of a multispindle gear head of the fixedly disposed drive mechanism and is axially displaceable relatively thereto so that the holder plate can be shifted along these fixed spindles while they rotate to extract the molded articles. In practice, the ejector pins can be extensions of the respective spindles.

In order to permit the gripping means to remove the threaded articles without disengagement therefrom in the course of unthreading, the mechanism further includes leadscrew means in step with the spindle rotation for retracting the holder upon engagement of the friction cups with the molded articles. Additionally, fluid-responsive means is provided to displace the holder when the related movement of the spindle and the holder is not required, i.e., after the article has been withdrawn from the mold or prior to engagement of the friction cups with the articles.

Still another feature of this invention resides in the provision of a pair of mold plates interchangeably positionable opposite another portion of the mold and disposed at diametrically opposite locations with respect to their axis of oscillation on a common carrier. Thus one of the plates of the mold can be in position at the molding station enabling the molding of additional articles, while the other mold plate is disposed at the unthreading station at which the articles are removed. It has been found that this oscillating movement of the mold-plate carrier eliminates complex arrangements for the supply of the cooling liquid to these plates and is a vast improvement over earlier proposals according to which a mold carrier performed continuous rotation about an axis. It has, moreover, been found that the present system can be highly efficient without a propensity to break-down due to misalignment and shock resulting from sudden stops when the angular oscillation of the mold-plate carrier is a harmonic motion. This can be accomplished, in accordance with the invention, by journaling the carrier on one of the stay or guide bars of the bed of the machine and providing it with a tubular shaft to which is fixed a pinion gear in mesh with a rack. A crank drive is then arranged to reciprocate the rack with harmonic motion. The control arrangements for the unthreading system can be integrated with the control systems for the various other parts of the injection-molding machine without difficulty.

The above and other objects, features and advantages of the present invention, will become more readily apparent from the following description, reference being made to the accompanying drawing in which.

General description of apparatus

While an injection-molding system of the type illustrated in FIGS. 1–6 makes use of a tripartite mold according to the invention, it will be understood that the principles herein disclosed are equally applicable to two-part molds, in which case the longitudinally fixed mold member can be swingable, and multi-part molds having more than the three members described in detail hereunder. The principles of the invention are applicable to all mold types in which one of two cooperating mold members is swingable transversely to the direction of mold closure.

In the system of FIGS. 1–6, the injection-molding machine has a bed 10 upon which is mounted a mold assembly 11, an injection assembly 12, a mold-opening-and-closing mechanism 13 and an unthreading device 14 offset from the path of the mold. As disclosed in my copending application Ser. No. 321,218 and described in my U.S. Patent No. 3,117,348, the mold-displacing mechanism 13 can include a crank-and-toggle drive or, alternatively, a conventional piston-and-cylinder arrangement adapted to displace the movable mold holder 15 along a pair of diagonally opposite tie bars or rails 16, 17 extending parallel to the direction of displacement of the mold holder 15 and passing through apertures in diagonally opposite corners of the latter. The guide rails 16, 17 are anchored at the mold-displacing mechanism 13 to the housing 18 thereof via nuts 19 and, at their opposite extremities, to an upstanding support plate 20 via nuts 21. Support plate 20 is rigidly fixed to the bed 10 of the machine. A connecting rod 22 couples the movable mold carrier 15 with the mold-displacing mechanism 13.

The injection mechanism can be identical with that described in my aforementioned patent and thus can include a housing 23 containing the injection plunger which is received in a cylinder 24 whose discharge port communicates via duct 25 with suitable passages in the fixed mold plate 26 and thus also with the cavity of the mold 27, removably mounted upon the fixed carrier 26. The movable member 28 of the mold is disposed upon the movable carrier 15. A plasticizing screw 29 feeds the injection-moldable thermoplastic synthetic resin to the injection cylinder 24 from which it is injected into the mold by the customary plunger.

Mold-plate assembly

As previously indicated, the mold assembly 11 is of the tripartite type including the fixed mold carrier 26 with its mold member 27, the longitudinally displaceable mold carrier 15 with its mold member, 28 and a swingable assembly generally designated by the reference numeral 30. The swingable assembly (FIG. 3) includes a pair of diametrically oppositely disposed mold plates 31a, 31b, adapted to retain the synthetic-resin, injection-molded articles 32 by their threaded portions. When the caps or other articles to be made are internally threaded, the mold plates will include at each mold aperture 33 a centrally positioned threaded core; in the present case, however, it can be assumed that the threaded articles 32 are to be externally threaded so that no core is required. While in practice a considerable number of articles may be made during each molding cycle, e.g. 24 plastic caps per mold plate, only four such articles and apertures have been shown herein for the sake of simplicity. The articles can conveniently be clustered in groups of, say, four, for reasons to become apparent hereinafter. The mold plates 31a, which correspond to the conventional so-called "B" plates of the usual tripartite molds, are bolted between respective arms 34a, 35a and 34b, 35b of a rotary holder 36, reinforced by webs 37. The arms 34a, 35a and 34b, 35b are provided with water-circulating channels (not shown) supplied with liquid from a fitting 38 by a flexible hose 39, a similar fitting 40 and hose 41 returning the cooling liquid to a reservoir 42 (FIG. 1), heat exchanger or waste collector; a pump 43 circulates the liquid via line 39 and fitting 38 through the arms of the swingable holder 36. The metallic arms are in surface contact along two sides of each mold plate 31a, 31b while being affixed to them by the metallic bolts 44, thereby ensuring excellent thermal conductivity from the mold plates to the cooled holder. As also apparent from FIGS. 3 and 6, the holder 36 is formed with a hub 45 provided with cooling channels 46 and is rotatably entrained by a tubular shaft 47 surrounding the upper tie bar 17 via a key 48 longitudinally slidable in a slot or keyway 49 of the tubular shaft 47. A lost-motion linkage is formed between the movable mold carrier 15 and the holder 36 by means of a plurality of rods 50, 51 angularly spaced about the tubular shaft 47 and threadedly fixed in a bearing 52 rotatable within the hub 45. The rods 50, 51 are provided with adjustably positionable nuts 53, 54 engageable by the mold carrier 15 when it is drawn to the left (FIG. 6) by the rod 22. A retaining ring 55 ensures that the holder 36 will be axially entrained by the rods 50, 51. Another set of rods 56 can extend to the right from a similar bearing 57 journaled in the hub 45 and held therein by a retaining ring 58, the rods 56 passing through the fixed mold carrier 26.

It will thus be evident that forward displacement of the mold carrier 15 (i.e. in the direction of arrow 59) will proceed while the plate holder 36 remains stationary until the mold member 28 abuts the mold plate 31b and entrains it together with the holder 36 to the right (arrow 59) along the tubular shaft 47 until the plate 31b abuts the stationary mold member 27. Pins 60, 61 on the movable and stationary mold members 28, 27 are receivable in pilot bores 62a, 62b of the mold plates 31a, 31b to ensure proper registry upon closure of the mold. When the mold opens, the movable member 15 is drawn to the left (FIG. 6) while the mold 31b remains in contact with stationary mold member 27 until the mold carrier 15 engages the adjustable abutment nuts 53, 54 and draws the rods 50, 51 to the left. The holder 36 is then withdrawn from contact with the stationary mold member 27 and restored to its original, left-hand position.

Mold-plate-swinging assembly

Figure 1:
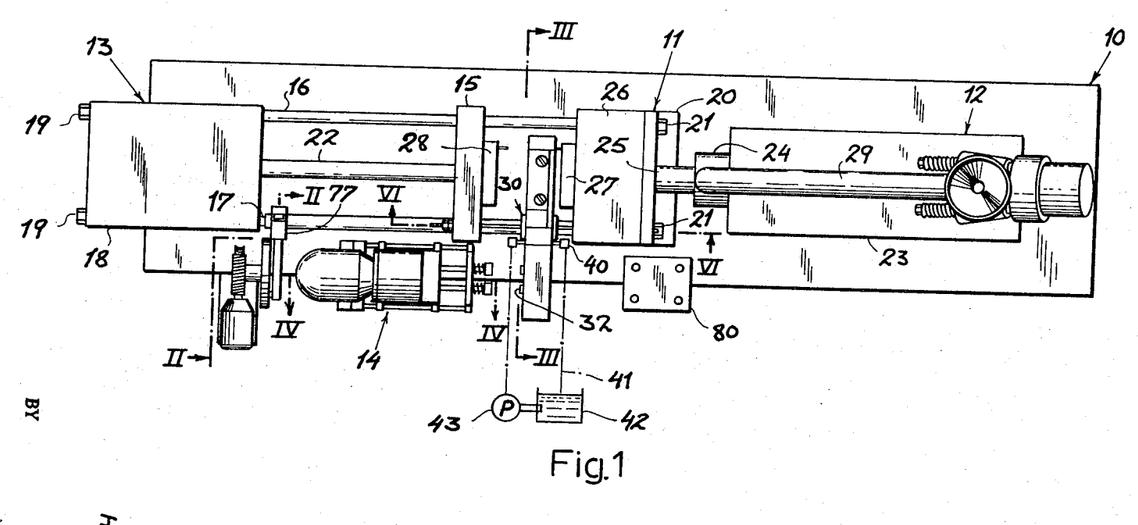
FIG. 1 is a plan view of an injection-molding machine using a tripartite mold and provided with an unthreading device according to the present invention.
Figure 2:
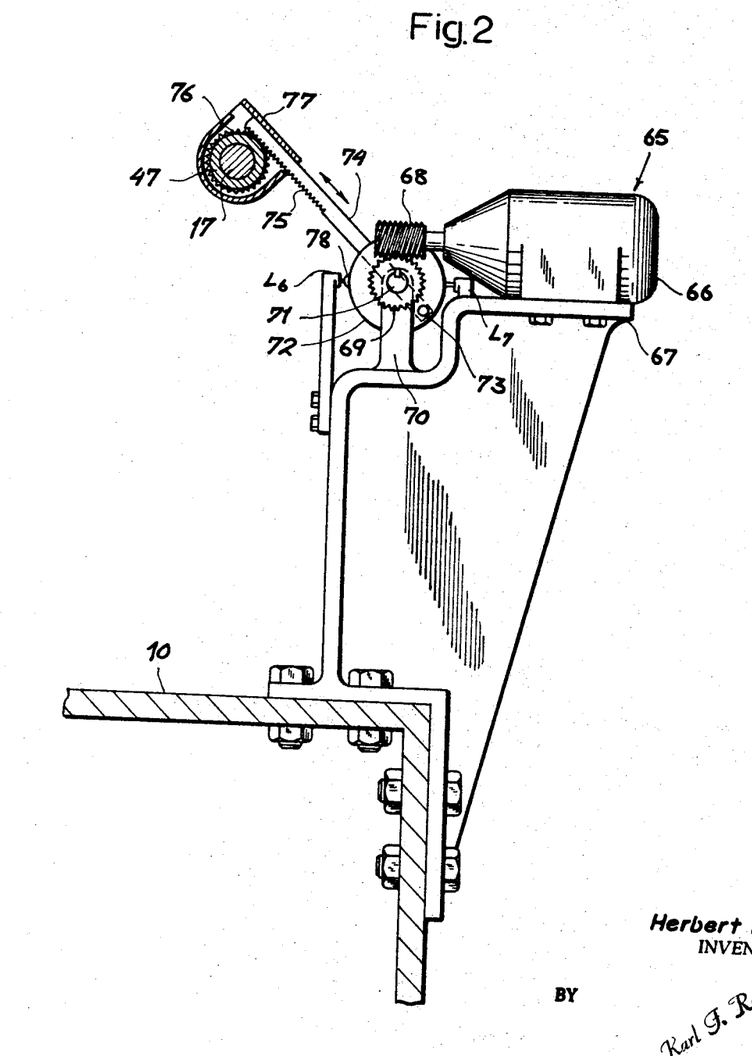
FIG. 2 is a cross-sectional view, drawn to en enlarged ale, of a portion of the machine of FIG. 1, taken along e line II—II thereof and showing the mold-plate-swinging mechanism.
Figure 3:
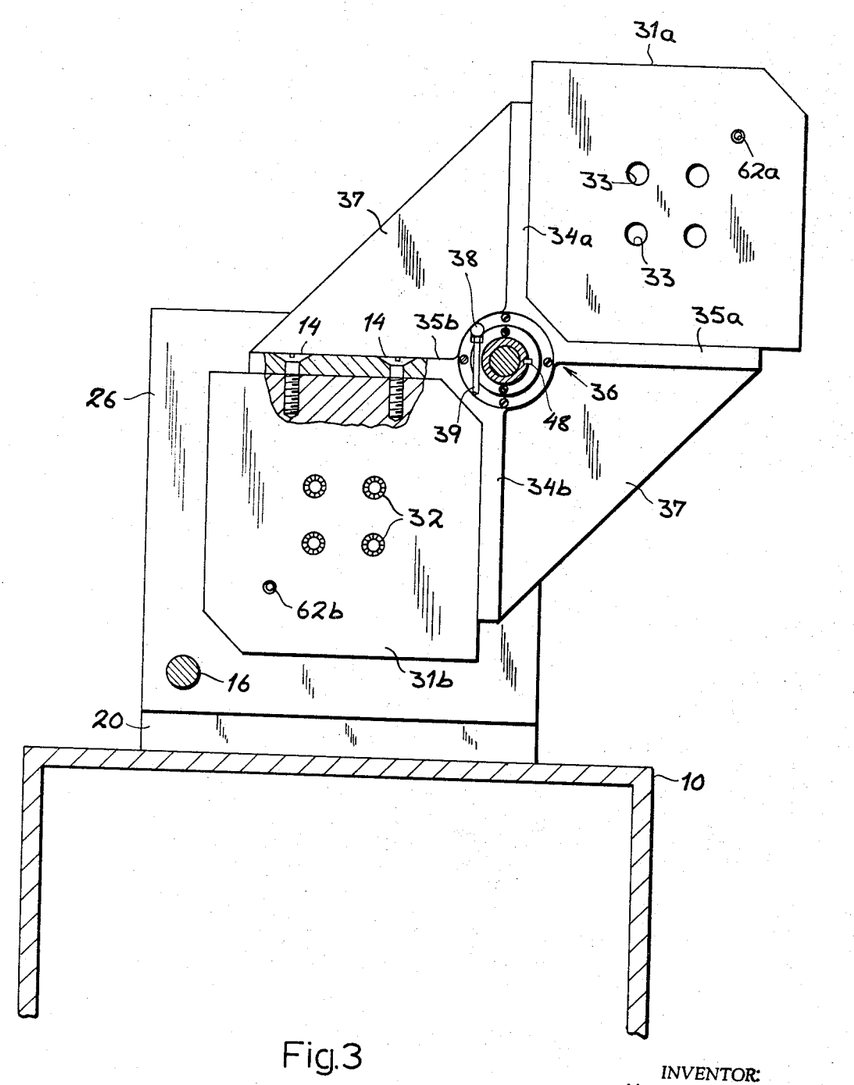
FIG. 3 is a vertical cross-sectional view taken along le line III—III of FIG. 1, illustrating the mold-plate older in elevation.

The mold holder 36 carrying the diametrically opposite mold plates 31a and 31b is swingable oscillatingly through an angle of about 180° to alternately dispose the plates at the molding station and at the unthreading or article-removing station at the upper right-hand position (as viewed in FIG. 3). The swinging mechanism includes the tubular shaft 47 which is rotatable upon the tie bar 17 to displace the holder 36. As best seen in FIGS. 1 and 2, the mechanism, generally designated 65, includes a unidirectional electric motor 66 mounted on a pedestal 67 of the bed 10 of the machine and provided with a worm 68 which is in continuous mesh with the worm wheel 69 upon a trunnion 70. The worm wheel is keyed to a shaft 71 upon which is mounted an eccentric wheel 72 whose eccentric pin 73 serves as a pivot for a rack 74, the teeth 75 of which mesh with the teeth 76 of a pinion gear formed rigid or integral with the tubular shaft 47 or mounted thereon and keyed thereto. A bracket 77 swingable about the axis of shaft 47 and the tie bar 17, forms a guide for the rack 74 and prevents its withdrawal from engagement with the pinion 76. It will be immediately apparent that rotation of the worm 68 by motor 66 will drive the eccentric disk 72 which constitutes a crank mechanism imparting longitudinal motion to the rack 74, this oscillating longitudinal motion being, in turn, converted to an angular oscillation of the tubular shaft 47 via its pinion 76 and the holder 36. The transferred movement is the harmonic motion of a crank so that the angular velocity of the holder as it is moved out of one extreme position and brought into the other is substantially less then its velocity between these positions. The energization circuit for the motor 66 includes, as will be apparent hereinafter, a pair of sensitive limit switches $L_6$ and $L_7$ which are operated by the cam portion 78 of the disk 72 and terminate its rotation after the holder has been angularly oscillated through an angle of about 180°.

Unthreading device

Figure 4:
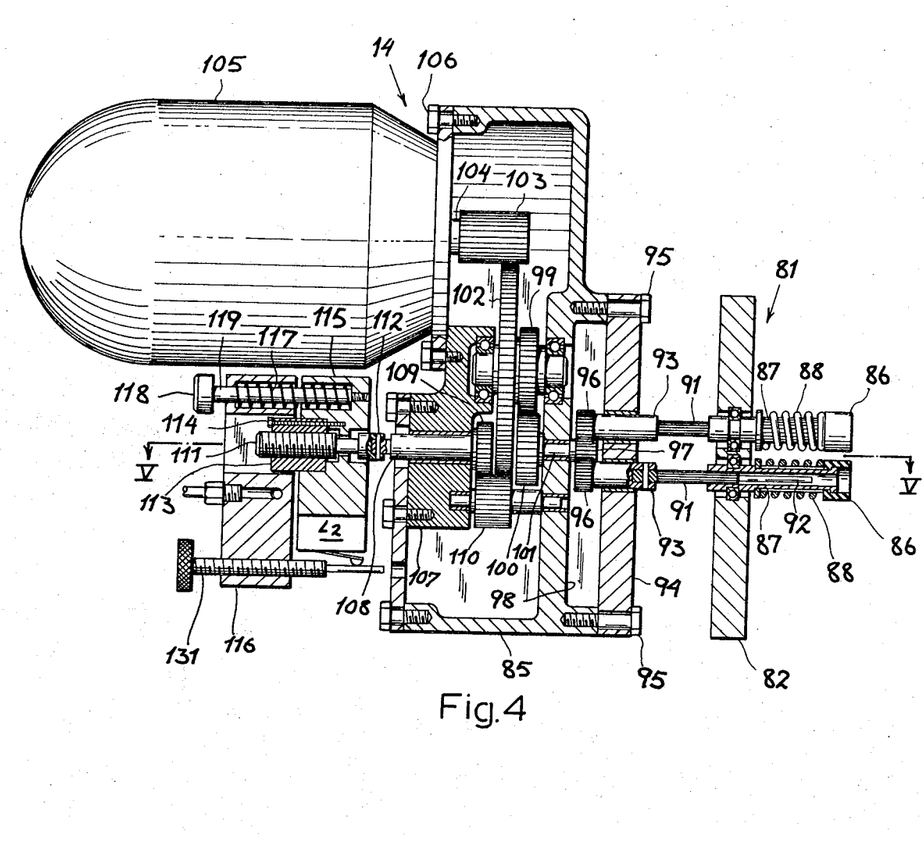
FIG. 4 is an enlarged cross-sectional view taken along le line IV—IV through the unthreading device of FIG. with the motor shown in elevation.
Figure 5:
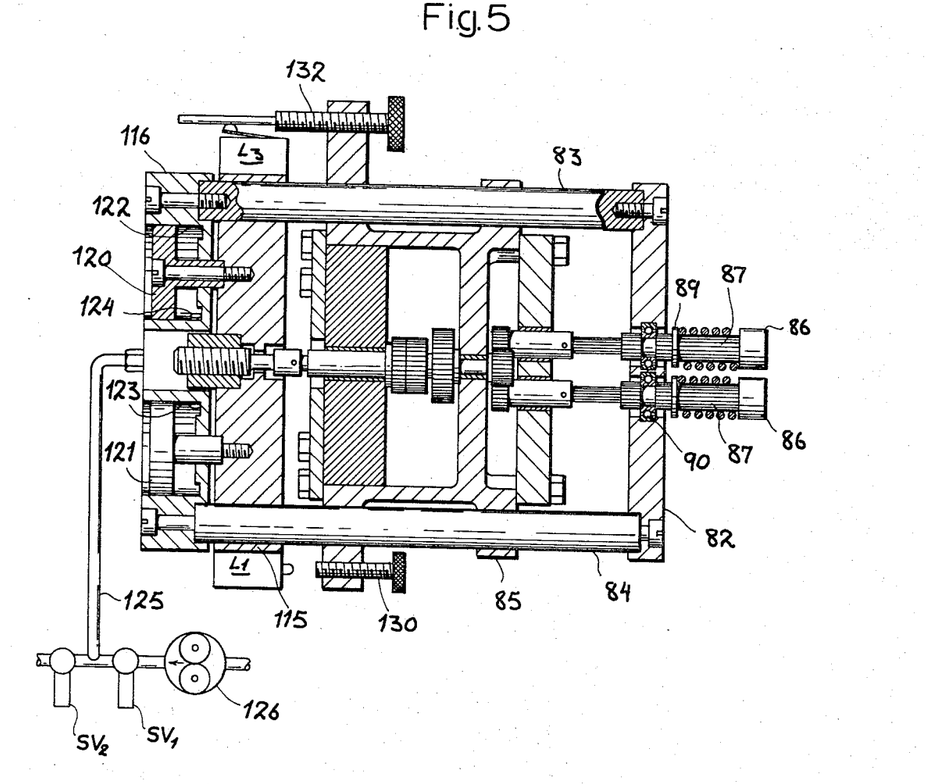
FIG. 5 is a further cross-sectional view, taken along he line V—V of FIG. 4, diagrammatically illustrating he control means and head assembly of the unthreading levice.
Figure 6:
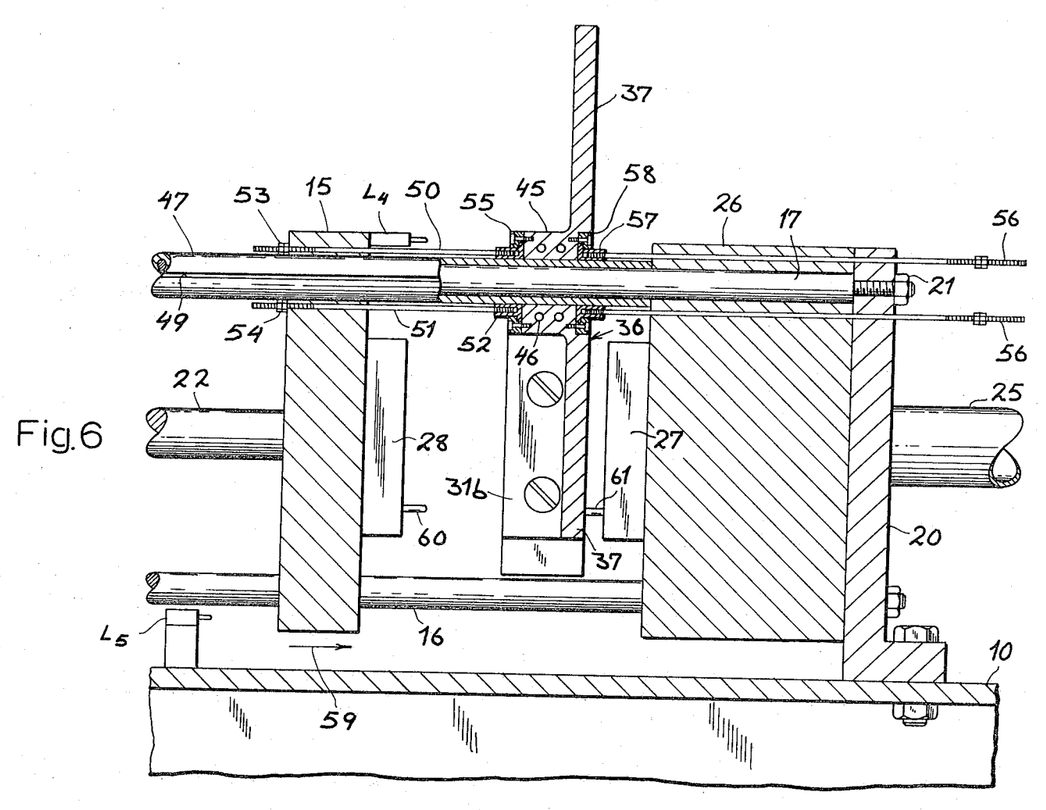
FIG. 6 is a cross-sectional view, drawn to an enlarged cale, taken along the line VI—VI of FIG. 1, showing he tripartite mold in one operating condition.

The unthreading device 14 of the system is disposed at the discharge station in line with the upper mold plate (e.g. 31a) and can be removably disposed on either one of a pair of pedestals 80 (only one seen in FIG. 1) on opposite sides of the swingable mold-plate assembly 30, depending upon the direction in which the articles must be unthreaded. In the embodiment shown, the articles are unscrewed from the left-hand side of the mold plates. Referring now to FIGS. 4 and 5, it will be seen that the unthreading device, generally designated by the reference numeral 14, includes a head 81 displaceable toward and away from the mold-plate assembly 30 at the discharge station. The head 81 consists essentially of a plate 82 carried by a pair of bars 83, 84 slidably mounted in the gear housing 85 and a plurality of gripper members 86 each aligned with a respective molded article and adapted to engage it frictionally for unthreading same from the mold plate. The gripper members are advantageously constituted as rubber cups axially shiftable upon the splined spindles 87 against the force of springs 88 normally urging the cups in the confronting direction of the mold plate. The springs 88 are seated against axially fixed abutments 89 on the spindles 87, which are journaled in respective bearings 90 of the support plate 82. The cups 86 are thus rotatably entrained by the spindles 87 but have limited freedom of spring-cushioned axial movement with respect thereto.

Upon referring now more specifically to the system of FIG. 4 it will be seen that each spindle 87 is rotatably driven by a splined shaft 91 which permits axial displacement of the spindles to dislodge the articles from the cups upon retraction of the unthreading device. Each of the splined shafts 91 is received within and pinned to a respective stub shaft 93, the latter being journaled in clusters within a support plate 94 mounted by bolts 95 onto the housing 85. The shafts 93 are integral with respective pinion 96 clustered about and in mesh with a common drive gear 97 disposed within the transmission compartment 98.

When a multiplicity of clusters of articles is to be provided on a single mold plate, it is desirous that the axis of the articles of each cluster be spaced by the same distance from a common axis; in this case, a drive gear such as that shown at 97 can be axially aligned with the axis of the cluster, while the axes of pinions 96 will be in line with the responsive axes of the molded articles. Similarly, the clusters can be disposed equidistantly from a common axis at which a main drive gear is disposed for meshing with and displacing the secondary drive gears which, in turn, mesh with the pinions 96. In a device as shown, wherein four friction cups constitute the single cluster, the main drive gear is shown at 99 and meshes with a gear 100 fixed to the shaft 101 carrying the secondary drive gear 97. Gear 99 is fixed to a large gear 102 in a speed-reducing train driven by a pinion 103 on the shaft 104 of an electric motor 105 bolted at 106 to the housing 85. The latter also contains a bearing block 107 rotatably supporting a leadscrew shaft 108 whose gear 109 meshes with a further gear 110, also driven by the large gear 102 of the speed-reducing train.

A leadscrew 111 is interchangeably joined to the shaft 108 by a pin 112 and co-operates with a removable nut 113, held in place by a screw 114, of a body 115 connected with the bars 83, 84 (FIG. 5) via a cylinder member 116. As will be apparent from FIG. 4, a plurality of compression springs, one of which is shown at 117, urge the members 115, 116 apart until the member 116 abuts against the head 118 of a screw 119 threaded into the body 115 and having an unthreaded shank surrounded by the compression spring 117. It is evident, therefore, that the rotation by motor 105 of pinion 103 is transmitted to the cups 86 which are driven in, say, the clockwise direction in step with the rate of advance of the plate 82, carrying the cup spindles 87, determined by the leadscrew 111. Upon reversal of the motor 105, the cups 86 are rotated in counterclockwise direction (as viewed in FIG. 3) as the cups are withdrawn from the plate. The pitch of the leadscrew is so chosen with respect to the rotation speed of the friction cups 86 that they threadedly withdraw the articles from their respective cavities in the mold plate while moving with the pitch determined by the threads on the articles, thereby preventing damage to these threads.

From FIG. 5, it will be seen that the nut-carrying member 115 of the leadscrew assembly is provided with a pair of pistons 120, 121 slidably received in respective cylinders 122, 123, while passages 124 connect the cylinder bores in front of the pistons with a duct 125. A solenoid valve $SV_1$ is interposed between an air compressor 126 and the duct 125 while a similar, normally closed solenoid valve $SV_2$ is disposed between this duct 125 and the atmosphere. When solenoid valve $SV_1$ is energized, compressed air flows into the cylinders 122, 123 to urge the members 115, 116 toward one another and displace the plate 82 carrying the spindles 87 and the cups 86 to the right (FIGS. 1, 4 and 5); simultaneously, the springs 117 (FIG. 4) are loaded. Since the solenoid valves both are normally closed in the absence of energization, the springs 117 remain in their compressed state. When, however, solenoid valve $SV_2$ is energized, the cylinders 122 and 123 are vented to the atmosphere so that springs 117 shift the members 115, 116 apart and draw the plate 82 to the left (FIG. 4) whereby ejector plungers 92 dislodge the articles retained in the cups 86.

Control circuit

Figure 7:
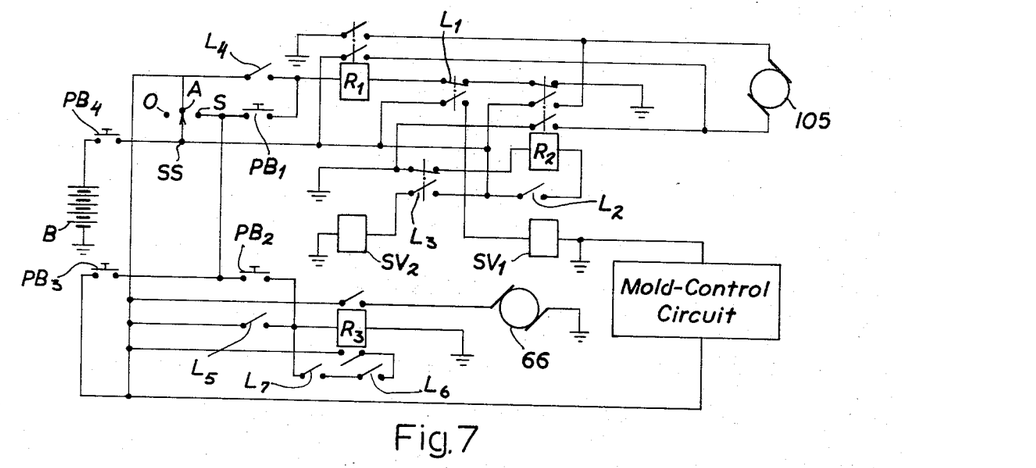
FIG. 7 is a circuit diagram of a suitable control system for the unthreading device.

In FIG. 7, I show a control circuit for the injection-molding machine which ensures the sequential operation to be described hereinafter. This circuit can comprise, for example, a source of electric current (e.g. a battery B) whose ungrounded terminal is connected in series with a main or safety switch $PB_4$ which, when closed, renders the circuit operative. The wiper of a selector switch SS, whose three operative modes are "off" O, "automatic" A and "semi-automatic" S, is connected in series with the switch $PB_4$. A further, "manual" mode of operation can, of course, be provided in place of the "off" mode. The selector switch is designed to energize, in position A, the mold-control circuit of my U.S. patent referred to above, to effect opening and closing of the mold with a predetermined operating sequence.

Additionally, a normally open limit switch L₄ (FIG. is carried by the movable mold holder 15 and is acted when this carrier picks up for displacement the lder 36 to energize a relay R₁, whose contacts close drive the motor 105 (FIG. 4) in the forward direction d advance the unthreading head 81 via the leadscrew 1. A limit switch L₁, having a set of normally closed ntacts in series with relay R₁ and a set of normally en contacts in series with the solenoid valve SV₁, can disposed upon the plate 115, as shown in FIG. 5, for engaging an adjustable abutment 130. As previously indicated, the operation of solenoid valve SV₁ causes the ljustable abutment 131 to close a limit switch L₂ carried y the plate 115 as plates 115 and 116 draw together. his switch L₂ energizes a relay R₂ whose contacts reverse the direction of drive of motor 105 and simultaneously de-energize the relay R₁. When the head 81 has een withdrawn sufficiently, another adjustable abutment 32 releases the limit switch L₃ (FIG. 5) whose hitherto losed contact de-energizes relay R₂ and whose erstwhile pen contact energizes solenoid valve SV₂ to release the ressure within cylinders 122 and 123 and eject the cups. During the mold-opening operation, the movable mold nember closes the limit switch L₅ (FIG. 6) to operate a holding relay R₃ whose back contact is connected in series with the limit switches L₆ and L₇ previously mentioned (FIG. 2). Limit switch L₅ is of the momentary-actuation type and closes for a period only sufficient to allow the front contact of relay R₃ to energize the motor 66 and advance the eccentric and cam disk 72 so that the protuberance 78 closes the switch L₆ or L₇ which it previously held open. Relay R₃ is then locked in the "on" condition until the protuberance 78 opens the other switch. A pushbutton PB₁ is provided for the manual operation of the unthreading unit, should control by the mold assembly be undesirable, while a pushbutton PB₂ serves the same function for the mold-plate swinging mechanism. A further pushbutton switch PB₃ affords manual operation of the mold-control circuit independently of the unthreading device.

*Operation*

Figure 8:
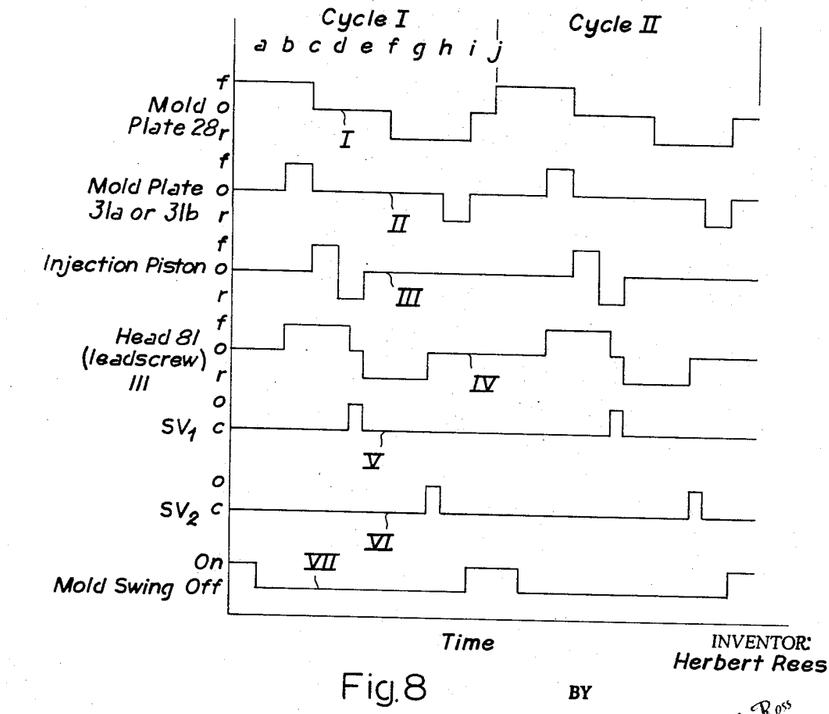
FIG. 8 is a timing diagram showing the correlated movements of the various mechanisms during two molding cycles.

Upon additional reference to FIG. 8 it will be seen that, at the start of a cycle, the movable mold plate 28 closes limit switch L₅ to operate relay R₃ and swing the mold holder 36 through an angle of about 180° to position the mold plate 31b, laden with the injection-molded articles 32, into alignment with the cups 86 of the unthreading apparatus. The mold-control circuit then begins (point a) to advance the mold in the forward direction (f) and, at a time corresponding to point b on the graph (f) of FIG. 8, the lost-motion connection brings the movable mold plate 28 on carrier 15 into contact with the mold plate 31a, newly positioned in the mold assembly 11. From point b to point c, the mold plate (graph II) is entrained by the movable carrier. Switch L₄ is simultaneously closed to energize the relay R₁ and drive the unthreading motor 105 in the forward direction of the leadscrew 111, as indicated in the graph IV. At point c, however, the mold is fully closed and injection can begin (period c to period f of graph III) with the injection piston or plunger being retracted in the usual manner. The forward drive of the unthreading head 81 terminates after the mold has been closed (graph IV) and, as the injection plunger is retracted r, the limit switch L₁ is tripped by the forward motion of assembly 115, 116, 81 to inactivate the motor 105 and open solenoid valve SV₁ (graph V). The opening of this valve draws the plate 116 to the right to bring the friction cups 86 into engagement with the molded articles 32 and firmly seat them in these cups. The limit switch L₂ is closed by the relative motion of plates 115 and 116 at the termination of the pneumatic forward stroke of head 81, which ensures that the cups 86 are nonrotating at contact with the articles. Relay R₂ is then energized (point e) and the reverse movement of the leadscrew (graph IV) withdraws the articles threadedly from their apertures upon entrainment by the rotating cups 86. The newly injected articles concurrently formed in the other mold plate (e.g. 31b) are allowed to cool during this period whereupon the mold circuit commences the reverse movement of the mold carrier 15 (graph I) and at time h effects entrainment of the mold-plate holder 36 in the reverse direction (graph II). Meanwhile, the reverse movement of the leadscrew (graph IV) has terminated at time g upon actuation of limit switch L₃ which simultaneously opens solenoid valve SV₂ (graph VI). Thus, the articles are ejected by plungers 92 from the friction cups 86 and the unthreading assembly has been returned to its original position. Continued movement of the mold again brings it into contact with limit switch L₅ to trigger the reverse mold swing (graph VII) as previously indicated. Manual operation of the various elements can be effected by the use of the pushbuttons PB₁ through PB₃ with the selector switch SS in its "semiautomatic" or "manual" position.

It will be understood that the invention as described and illustrated admits of many modifications and variations within the skill of persons involved in the art. Thus, the mold need not be tripartite as indicated earlier nor need the swinging portion of the mold be a longitudinally movable member. In fact, when a two-part mold is employed, it is desirable that the swinging member be the one that is longitudinally stationary. Furthermore, the circuit and control arrangement can make use of timing devices or programming systems of any convenient type without the exercise of invention. It should be noted that the friction cups 86, which are readily interchangeable to accommodate the contours and dimensions of the molded articles, can be replaced, if desired, by other gripping means, including suction devices. Interchangeable friction cups are desirable because various materials might require gripper elements having different degrees of resiliency. While the limit switches controlling the unthreading head and drive have been shown with screw-type adjustable abutments, it is equally possible that the limit switches themselves may be movable or that time-delay relays or servo-mechanisms are employed. It should also be noted that, whereas it has been found to be advantageous to use an upper tie bar to support the swingable mold holder, some other axis can be provided, offset from the mold path as required. The oscillating movement of the mold holder, which reverses direction for each of its swings, ensures that the water-supply tubes 38, 40 etc. will not be broken and complex rotary distributors will not be required. The springs 88 bearing against the gripper cups 86 force these cups onto the articles with the cushioned thrust required when the pneumatic advance of the head 81 is effected, while the exchangeability of the leadscrew and nut assembly 111 through 114 ensures that the unscrewing head will be capable of accommodating articles of various pitch.

I claim:
1. In an injection-molding machine having a divided mold with a plurality of portions separable by relative motion along a mold axis, one of said portions being provided with a swingable carrier for displacement in a plane transverse to said mold axis, the last-mentioned mold portion having at least one cavity with peripheral screw threads for the molding of a complementarily threaded article projecting from said cavity upon separation of said portions, the combination therewith of an unthreading station offset from said mold axis comprising:
  a holder displaceable in a direction parallel to said mold axis and including two members of limited relative axial mobility;
  rotatable gripper means on one of said members engageable with the projecting part of a molded article in a swung-out position of said last-mentioned mold portion;
  first drive means coupled with the other of said mem- bers and said gripper means for rotating and axially advancing the latter with a resulting helical motion at a pitch corresponding to that of said screw threads; second drive means on said holder for further advancing said gripper means by relatively shifting said members upon deactivation of said first drive means whereby said gripper means can be moved into engagement with said molded article from a terminal position proximal to the swung-out mold portion; and switch means effective upon such engagement for reverse-operating said first drive means to unthread said molded article from said cavity.

2. The combination defined in claim 1 wherein said unthreading station further comprises a stationary support; said first drive means including a leadscrew journaled in said support and engaging said one of said members, and motor means for rotating said leadscrew in synchronism with said gripper means.

3. The combination defined in claim 2 wherein said second drive means comprises a source of pressure fluid independent of said motor means.

4. The combination defined in claim 3, further comprising spring means counteracting the pressure of said fluid for returning said members an initial relative position upon cessation of reverse operation of said first drive means and deactivation of said second drive means in an alternate terminal position remote from the swung-out mold portion.

5. The combination defined in claim 4 wherein said support is provided with ejection means effective upon return of said members to said initial position for dislodging the molded article from said gripping means.

6. In an injection-molding machine having a divided mold with a plurality of portions separable by relative motion along a mold axis, said portions including a stationary mold portion, an axially movable mold portion and a pair of intermediate mold portions on opposite sides of a carrier reversibly swingable through 180° in a plane transverse to said mold axis for alternate interposition between said stationary and movable mold portions, each of said intermediate mold portions having at least one cavity with peripheral screw threads for the molding of a complementarily threaded article projecting from said cavity upon separation of said portions, the combination therewith of an unthreading station offset from said mold axis comprising:

a holder displaceable in a direction parallel to said mold axis and including two members of limited relative axial mobility;

rotatable grippers means on one of said members engageable with the projecting part of a molded article in a swung-out position of one of said intermediate mold portions;

first drive means coupled with the other of said members and said gripper means for rotating and axially advancing the latter with a resulting helical motion at a pitch corresponding to that of said screw threads;

second drive means on said holder for further advancing said gripper means by relatively shifting said members upon deactivation of said first drive means whereby said gripper means can be moved into engagement with said molded article from a terminal position proximal to the swung-out intermediate mold portion; and switch means effective upon such engagement for reverse-operating said first drive means to unthread said molded article from said cavity.

7. The combination defined in claim 6 wherein said machine is provided with a bed having a pair of tie bars for the guidance of said movable mold portion, said carrier being mounted for swinging on one of said tie bars.

References Cited

UNITED STATES PATENTS

| 2,363,808 | 11/1944 | Sayre. | |
| 2,391,527 | 12/1945 | Tracy | 18—2 XR |
| 3,084,387 | 4/1963 | Tochner et al. | 18—2 XR |
| 3,091,810 | 6/1963 | Turner | 18—30 |

FOREIGN PATENTS

| 972,331 | 10/1964 | Great Britain. |

WILLIAM J. STEPHENSON, *Primary Examiner.*